United States Patent [19]
Pavoz et al.

[11] Patent Number: 5,189,268
[45] Date of Patent: Feb. 23, 1993

[54] ELEVATOR WITH LINEAR MOTOR DRIVE ASSEMBLY

[75] Inventors: Marcel Pavoz, Nanterre, France; Ernest P. Gagnon, Manchester, Conn.

[73] Assignee: Otis Elevator Company, Farmington, Conn.

[21] Appl. No.: 785,604

[22] Filed: Oct. 30, 1991

[51] Int. Cl.$^5$ .......................................... H02K 42/00
[52] U.S. Cl. .................................. 187/112; 187/122; 310/12
[58] Field of Search .................... 187/77, 112, 122; 318/136; 310/12, 13, 14

[56] References Cited

U.S. PATENT DOCUMENTS

| | | | |
|---|---|---|---|
| 3,746,899 | 7/1973 | Eastham | 310/12 |
| 4,454,457 | 6/1984 | Nakamura et al. | 318/135 |
| 4,594,520 | 6/1986 | Mira et al. | 310/12 |
| 5,023,496 | 6/1991 | Niikura | 310/12 |
| 5,033,587 | 6/1991 | Nakai et al. | 187/77 |
| 5,062,501 | 11/1991 | Pavoz et al. | 187/112 |
| 5,090,516 | 2/1992 | Grinaski et al. | 187/112 |

FOREIGN PATENT DOCUMENTS

| | | | |
|---|---|---|---|
| 0033964 | 2/1983 | Japan | 310/12 |
| 0142957 | 6/1986 | Japan | 310/12 |
| 63-117884 | 5/1988 | Japan | |

OTHER PUBLICATIONS

"Fundamentals of Linear Motor Technology", *Linear Electric Motors*, by Syed Nasar ad I. Boblea, Prentice-Hall, 1987.

*Primary Examiner*—Steven L. Stephan
*Assistant Examiner*—Thomas M. Dougherty
*Attorney, Agent, or Firm*—Lloyd D. Doigan; Richard D. Getz

[57] ABSTRACT

A multiple linear motor arrangement is provided having a secondary, a first primary, a plurality of second primaries, and a frame, in which the body of the first primary of the motor arrangement on one side of the secondary is offset from the bodies of the second primaries on the other side of the secondary. Magnetic flux emanating from the first and second primaries, therefore, does not appreciably overlap.

18 Claims, 2 Drawing Sheets

ELEVATOR WITH LINEAR MOTOR DRIVE ASSEMBLY

TECHNICAL FIELD

This invention relates to an elevator linear motor drive assembly.

BACKGROUND ART

Linear motors having a flat secondary and a flat, mobile primary(s) may be employed as drive means for elevators. In one embodiment, a rail fixedly mounted in the hoistway acts as the secondary of the linear motor. The primary(s) attaches to and drives either the elevator car or the counterweight, using the rail as both secondary and guide. This elevator drive arrangement advantageously fits within the hoistway, thereby eliminating the need for a separate machine room.

Linear motor drives are not without their problems, however. To begin, standard guide rails typically do not provide enough cross-sectional area to accommodate the magnitude of magnetic flux generated by the motor primary. As a result, the density of the flux in the rail generally exceeds acceptable limits, thereby negatively effecting motor performance.

The problem is exacerbated in multiple motor configurations. For example, Japanese Patent Publication No. 63-117884 by Mitsui teaches a four-motor configuration having two pairs of motors symmetrically opposed to one another. Symmetrically opposed motors offer the advantage of each motor's attractive force balancing the attractive force of the other motor. The disadvantage of symmetrically aligned motors is that the cross-section of the guide rail (or secondary) must be wide enough to accommodate the magnetic flux generated from primaries on both sides of the rail. Wider secondaries are more expensive to both fabricate and to install. In some applications heavier rails may even require that the building be reinforced to accommodate the increased load.

In addition, four-motor configurations as taught by Mitsui are inherently inefficient. All flat linear motors have motor windings which include numerous coil ends extending out from the metallic body of the primary. The shape of each coil end is determined by the smallest geometry possible which still permits the motor windings to be routed through the metallic body of the primary. Since the coil ends extend a length outside the body of the primary, they do not participate in the motor thrust and consequently do not increase the efficiency of the motor. In fact, they create joule losses thereby decreasing the efficiency of the motor.

Mitsui's multi-motor arrangement, with four similar primaries, has the same ratio of primary body width to coil end length as a linear motor with a single primary of similar primary body width. In the four primary arrangement, the amount of body width and coil end length is just a multiple of that in the single primary linear motor. Therefore, whatever inefficiencies are associated with the ratio of primary body width to coil end length in the single primary are present in the four primary arrangement of Mitsui, assuming that all other variables such as the numbers of windings remain constant.

In sum, what is needed is a new multiple linear motor arrangement.

DISCLOSURE OF THE INVENTION

It is, therefore, an object of the present invention to increase the efficiency of a multi-primary linear motor arrangement.

It is a further object of the present invention to provide a linear motor which minimizes fabrication and installation expenses.

According to the present invention, an elevator multiple linear motor arrangement is provided in which the body of the primary(s) of the motor arrangement on one side of the secondary is offset from the body of the primary(s) on the other side of the secondary, and therefore does not appreciably overlap.

An advantage of the present invention is the orientation of the magnetic fields in the secondary due to the configuration of the primaries. Offsetting the primaries permits the magnetic field emanating from each primary to access a different region of the secondary, without appreciably overlapping each other. The flux density in each region is therefore attributable to a single primary. Consequently, design constraints on the secondary's cross-sectional area created by primary magnetic flux are effectively halved. The secondary, therefore, may be fabricated lighter and installed less expensively, since no hoistway reinforcement is required.

A further advantage of the present invention is the increase in efficiency created by the present invention's increase in ratio of primary body width to coil end length. The present invention positions an equal amount of primary body width, using primaries of equal length, on each side of the secondary as is taught in the prior art. Equal amounts of primary body width on each side of the secondary creates a force balance across the secondary. The present invention creates the force balance, however, with an overall odd number of primaries. As a result, the ratio of primary body width to coil end length increases, thereby eliminating a percentage of the inefficiencies associated with end windings. The overall efficiency of the linear motor, therefore increases.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
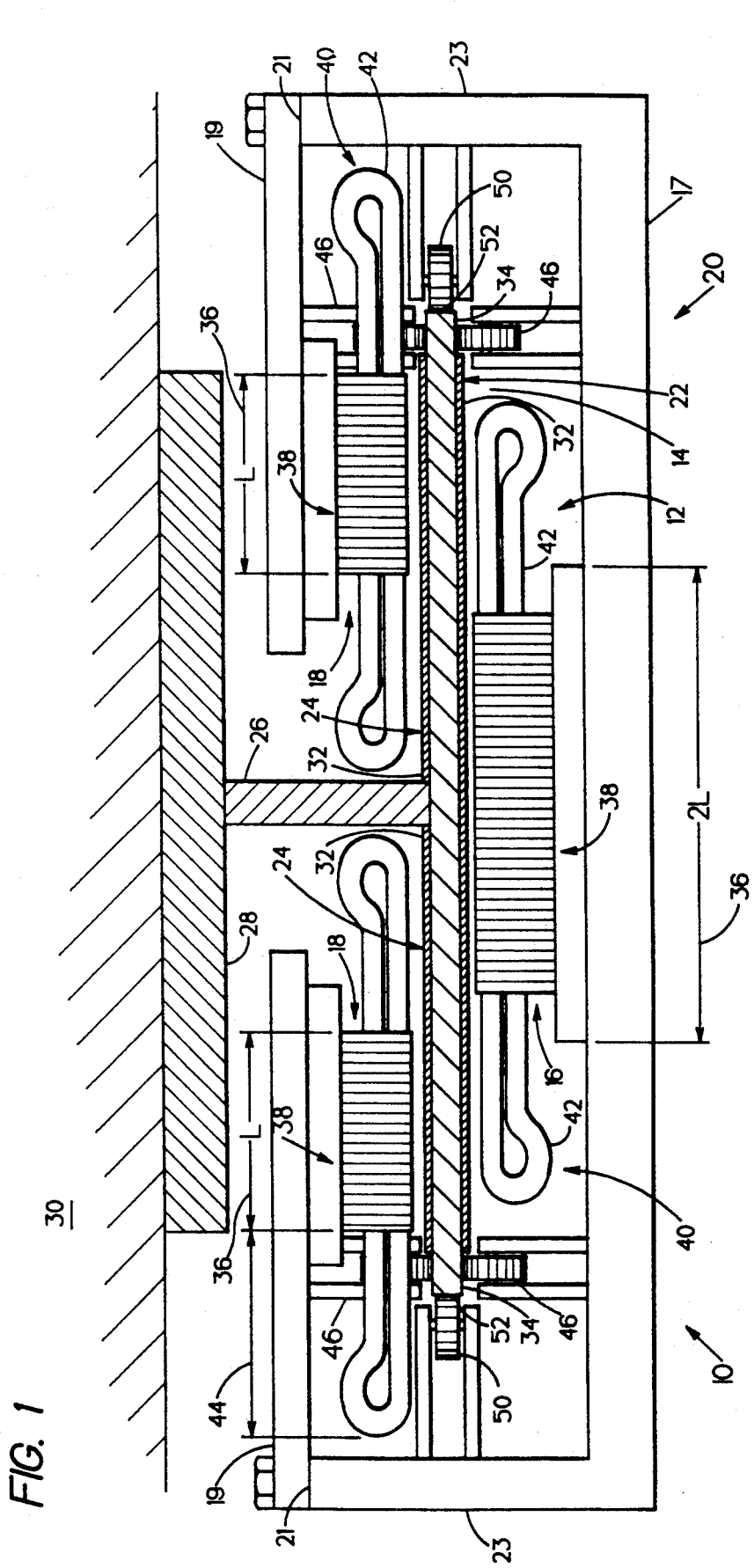
FIG. 1 shows a cross-sectional embodiment of the multiple linear motor arrangement of the present invention.
Figure 2:
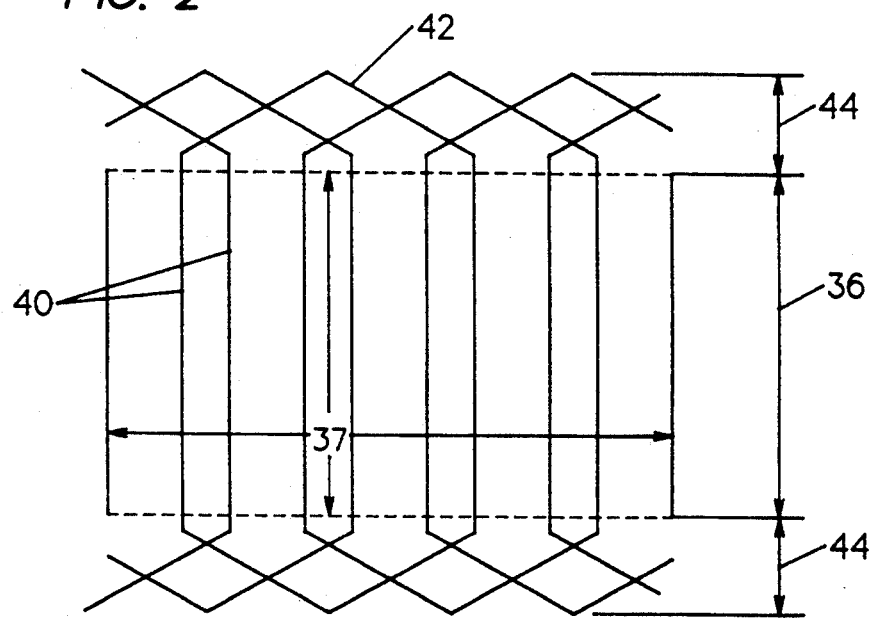
FIG. 2 is a diagrammatic view of a primary element of FIG. 1 showing the end windings and the primary body width.

Referring to FIGS. 1 and 2, a linear motor comprising a secondary 14, a first primary 16, and two second primaries 18 provides motive power for an elevator (not shown). The elevator comprises an elevator car (not shown) and a counterweight assembly 10 attached to one another by a series of ropes in a hoistway (not shown), as is known in the art. The counterweight assembly includes the primaries of the linear motor and a frame 20 attached to the primaries. The frame comprises a "U"-shaped body 17 and two flat primary supports 19 bolted to the ends 21 of the legs 23 of the "U".

The secondary 14 has a first side 22 and a second side 24 and extends throughout the hoistway 30. A web 26 conventionally attaches to the center of the secondary's second side and outwardly extends, perpendicular to the secondary. The end of the web opposite the secondary conventionally attaches to a base plate 28 which in turn is secured to the hoistway. The "T" shaped secondary acts as the guide rail for the counterweight assembly.

A coating or layer 32 of highly conductive metal such as aluminum may be attached to the first 22 and second sides 24 of the secondary 14. The layer of highly conductive metal 32 does not cover the entire first or second side. Bare side margins 34 are left which permit braking or guidance on the secondary without damage to the highly conductive layer.

Each primary 16,18 has a body 38 defined by a width 36 and a surface area 37 (see FIG. 2). A plurality of windings 40 run through the body 38 of the primary, extending out on two sides of the body, as is known in the art. The windings outside of the body are called end windings or coil ends 42. Because the coil ends create inefficiencies in the motor, it is desirable to minimize the coil end length 44. Physical constraints, however, prevent the coil ends from being minimized beyond a certain point, thereby creating an inherent inefficiency in the flat linear motor.

The counterweight assembly includes a set of rollers 46 attached to the frame 20 which act against the secondary 14. The rollers 46 maintain the frame, and therefore the primaries, a predetermined distance from the secondary. The distance is known in the art as the "separation distance" or the "air gap". A set of second rollers 50 acts against the outside edges 52 of the secondary. The second rollers keep the frame and the primaries in the correct position parallel to the secondary.

When the counterweight assembly 10 is positioned within the hoistway, the first primary 16 mounts on an interior side of the frame 20, in close proximity to the first side 22 of the secondary 14. The second primaries 18 mount on the opposite interior side of the frame, in close proximity to the second side 24 of the secondary. The bodies of the first and second primaries are offset from one another. In other words, if the bodies of the first and second primaries which are ordinarily on different sides of the secondary, were moved into the same plane on the same side of the secondary, the bodies would not appreciably overlap each other, if at all.

If the primaries 16,18 overlapped or were aligned with one another on opposite sides of the secondary 14, the magnetic flux from each would enter the same cross-sectional area of the secondary. As a result, the magnetic flux density would equal the sum of the flux densities attributable to each primary. In that instance, the combined flux density may be greater than the saturation level permissible within the secondary.

In the present invention, the primaries 16,18 do not appreciably overlap. The magnetic flux densities attributable to all three primaries, therefore, are not additive and the cross-sectional area of the secondary 14 must only accommodate the magnetic flux emanating from a single primary in any given region. This allows the secondary to be designed in a more narrow, lighter, and less expensive configuration. Other design considerations, such as strength and rigidity, may also affect the design of the guide rail.

A person of skill in the art will recognize that the offset configuration of the primaries 16,18 relative to the secondary 14 in the present invention may be used with secondary geometries other than the "T" geometry of the best mode.

The configuration of the primaries 16,18 increases the ratio of the primary body width 36 to the coil end length 44 (see FIG. 2). In the prior art multiple linear motor arrangement, equal numbers of primaries were positioned opposite one another to balance the attractive forces created by the motors. Because the number of primaries were equal, the ratio of the body width 36 to the coil end length 44 was the same for "n" number of primaries as it was for a single primary.

In the present invention, two "L" width primaries (the second primaries 18), are positioned on one side of the secondary 14. A single "2L" width primary (the first primary 16) is positioned on the other side, thereby creating a force balance across the secondary. As a result, the ratio of body width 36 to coil end length 44 is four body widths to six coil end lengths, or in unitless terms, a ratio of two-thirds. In the prior art configurations with equal numbers of primaries, the ratio is one body width 36 to two coil end lengths 44, or a unitless ratio of one-half.

In this example, the increase in the unitless ratio from one-half to two-thirds represents an increase in motor efficiency for two reasons. First, motor thrust increases as the primary body width 36 percentage increases. Second, coil end joule losses decrease as the coil end length 44 percentage decreases.

A person skilled in the art will recognize that the unitless ratios of $\frac{2}{3}$ and $\frac{1}{2}$ discussed heretofore represent an illustrative example focusing on one embodiment. Other embodiments incorporating the teachings of the present invention may include primaries with different geometries which would therefore alter the exact ratios discussed.

Although this invention has been shown and described with respect to the detailed embodiments thereof, it will be understood by those skilled in the art that various changes in form and detail thereof may be made without departing from the spirit and scope of the claimed invention.

We claim:

1. A linear motor for providing motive force to an elevator in a hoistway comprising:
   a secondary, having a thickness, a first side and a second side;
   a first primary, having a body with a surface area and a width;
   a plurality of second primaries, each having a body with a surface area and a width; and
   a frame, for mounting said first primary in close proximity to said first side of said secondary, and for mounting said second primaries in close proximity to said second side of said secondary, wherein said body of said first primary is offset from said bodies of said second primaries.

2. A linear motor for providing motive force to an elevator according to claim 1, wherein said surface area of said first primary equals the total surface area of said second primaries.

3. A linear motor for providing motive force to an elevator according to claim 2, wherein said width of said first primary equals the total said width of said second primaries.

4. A linear motor for providing motive force to an elevator according to claim 1, wherein said secondary further comprises a web extending outwardly from said second side of said secondary.

5. A linear motor for providing motive force to an elevator according to claim 4, wherein at least one of said second primaries is positioned on each side of said web.

6. A linear motor for providing motive force to an elevator according to claim 1, wherein said total number of said first primaries and said second primaries is an odd number.

7. A linear motor for providing motive force to an elevator in a hoistway comprising:
- a secondary, having a thickness, a first side and a second side;
- a first primary, having a body with a surface area and a width, and a plurality of coil ends having a coil end length;
- a plurality of second primaries, each having, a body with a surface area and a width, and a plurality of coil ends having a coil end length; and
- a frame, for mounting said first primary in close proximity to said first side of said secondary, and for mounting said second primaries in close proximity to said second side of said secondary, wherein said body of said first primary is offset from said bodies of said second primaries, such that said thickness of said secondary is minimized and such that a ratio of a sum of said widths of said primary bodies to a sum of said coil end lengths of said coil ends is maximized.

8. A linear motor for providing motive force to an elevator according to claim 7, wherein said surface area of said first primary equals the total surface area of said second primaries.

9. A linear motor for providing motive force to an elevator according to claim 8, wherein said width of said first primary equals the total said width of said second primaries.

10. A linear motor for providing motive force to an elevator according to claim 7, wherein said secondary further comprises a web extending outwardly from said second side of said secondary.

11. A linear motor for providing motive force to an elevator according to claim 10, wherein at least one of said second primaries is positioned on each side of said web.

12. A linear motor for providing motive force to an elevator according to claim 7, wherein said total number of said first primaries and said second primaries is an odd number.

13. A linear motor for providing motive force to an elevator in a hoistway comprising:
- a secondary, having a thickness, a first side and a second side;
- a given number of first primaries, each having a body with a surface area and a width;
- a greater number than said given number of first primaries of second primaries, each having a body with a surface area and a width; and
- a frame, for mounting said first primaries in close proximity to said first side of said secondary, and for mounting said second primaries in close proximity to said second side of said secondary, wherein said bodies of said first primaries are offset from said bodies of said second primaries such that the magnetic flux emanating from said first and second primaries does not appreciably overlap and is therefore not appreciably additive.

14. A linear motor for providing motive force to an elevator according to claim 13, wherein said surface area of said first primary equals the total surface area of said second primaries.

15. A linear motor for providing motive force to an elevator according to claim 14, wherein said width of said first primary equals the total said width of said second primaries.

16. A linear motor for providing motive force to an elevator according to claim 13, wherein said secondary further comprises a web extending outwardly from said second side of said secondary.

17. A linear motor for providing motive force to an elevator according to claim 16, wherein at least one of said second primaries is positioned on each side of said web.

18. A linear motor for providing motive force to an elevator according to claim 13, wherein said total number of said first primaries and said second primaries is an odd number.

* * * * *